United States Patent [19]

Rieder et al.

[11] Patent Number: 5,152,066
[45] Date of Patent: Oct. 6, 1992

[54] ANGLE ENCODER

[75] Inventors: Heinz Rieder, Oberndorf; Max Schwaiger, Ostermiething, both of Austria

[73] Assignee: Sentop Rieder & Schwaiger Gesellschaft m.b.H., Tarsdorf, Austria

[21] Appl. No.: 799,386

[22] Filed: Nov. 27, 1991

[30] Foreign Application Priority Data

Dec. 10, 1990 [AT] Austria .................. 2496/90

[51] Int. Cl.⁵ .............................................. G01B 11/00
[52] U.S. Cl. .................................... 33/1 PT; 33/707; 33/1 L
[58] Field of Search ............. 33/1 L, 1 N, 1 PT, 706, 33/707, 736, 772, 779–782, 734–735; 250/231.1, 231.11, 231.13, 231.14, 231.15, 237 R

[56] References Cited
U.S. PATENT DOCUMENTS 4,387,299 6/1983 Akiyama .................. 250/231.14
4,530,155 7/1985 Burkhardt .................. 33/1 L
4,972,599 11/1990 Ernst ..................... 33/706

Primary Examiner—Harry N. Haroian
Attorney, Agent, or Firm—Collard & Roe

[57] ABSTRACT

The angle encoder comprises a transmitter disk, which is provided with two circular measuring scales, preferably incremental measuring scales. A scanning unit is associated with each of said measuring scales and during a rotation of said disk relative to said scanning head is adapted to scan said scale with reflected light and to optoelectronically generate measured-value signals, such as control signals in response to said scanning. To minimize the effect of a radial runout on the accuracy of the measurement and to permit a providing of the measuring scales on the transmitter disk by a copying process, the transmitter disk has at least one frustoconical outside surface, which is centered on the axis of rotation and is provided with the measuring scales. A process of manufacturing the transmitter disk is also described.

14 Claims, 1 Drawing Sheet

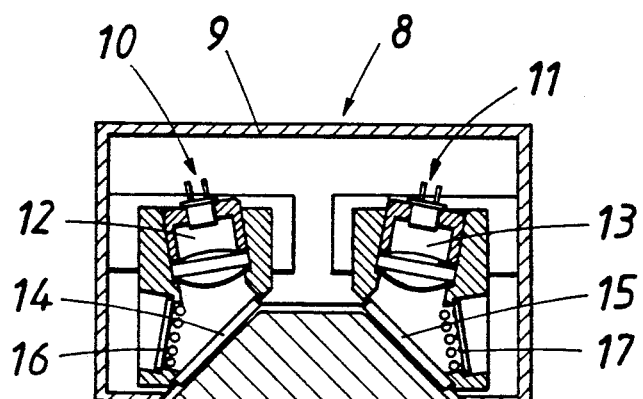
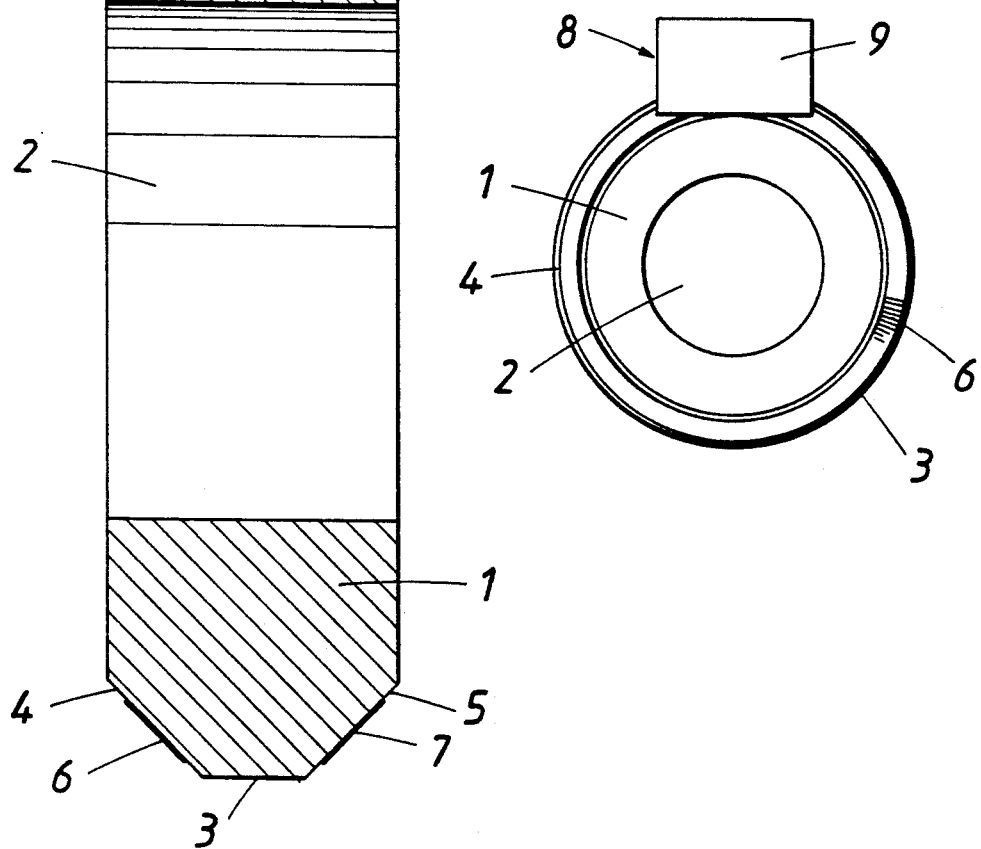

ANGLE ENCODER

BACKGROUND OF THE INVENTION

1. Field of the Invention

This invention relates to an angle encoder comprising a transmitter disk, which is provided with at least one circular measuring scale, particularly incremental scales, and scanning means, which are operable to scan said at least one measuring scale with reflected light during a rotation of said disk relative to said scanning means and to optoelectronically generate measured-value signals and/or control signals in response to such scanning.

2. Description of the Prior Art

Such angle encoders are used, inter alia, with machine tools, such as lathes, and on automatic manufacturing equipment. In such uses the transmitter disk is preferably mounted directly on a main spindle or motion-transmitting screw of the associated machine and is thus integrated in the machine rather than used as a constituent part of a separate measuring instrument, which has a shaft that serves only to drive the transmitter disk and must be coupled to a mainshaft of the machine in the closest possible alignment therewith. In one possible embodiment one of the circular measuring scale has a very small pitch and comprises, e.g., graduation lines or increments consisting of bright and dark fields in a number of an order of 18,000. In such a case it is possible to take measurements even at high speeds up to, e.g., 12,000 r.p.m. and signals generated in response to the scanning of such scale can be used to monitor the motor speed and the synchronism in machining operations. In addition to the main measuring scale, additional marks may be provided and may also be scanned and may be associated with defined angular positions and may be used, e.g., for a generation of synchronizing pulses. A second circular measuring scale may be provided, which has a larger pitch and comprises preferably $2^n$ graduations or increments, e.g., $2^{10} = 1024$ graduations or increments, and may be used for a generation of control signals in defined angular positions; such signals are required, e.g., for thread cutting. The small-pitch scale permits an selection of defined angular positions of a spindle, or motion-transmitting screw e.g., when a lathe is used for milling operations.

In arrangements in which transmitter disks are integrated in measuring instruments, which must be coupled to a mainshaft, it is known to use a transmitter disk which is transparent at least at the measuring scales and to provide the measuring scales in two concentric tracks on the end faces of the disk. In that case the radial graduation lines or the empty fields disposed in the incremental scale between such lines will necessarily be wedge-shaped. Such measuring scales can be scanned with transmitted light by means of illuminating means provided on one side of the transmitter disk and scanning units provided on the side and consisting in most cases of photovoltaic cells preceded by gratings for scanning the measuring scale. As the measuring scale may be made in photographic or photolithographic process by means of exposing masks, the costs of making such scales are within tolerable limits. The transmitter disk must be mounted in a separate measuring instrument, which has a shaft that must be coupled to a shaft or spindle or motion-transmitting screw of the machine tool in the closest possible alignment therewith. This is necessary because owing to the wedge shape of the scale elements such angle encoders are highly sensitive to a radial runout. In the selected example of a measuring scale having 18,000 increments the radial runout must not exceed about 1 μm if usable measured-value signals are to be obtained by the scanning of a transmitter disk which is reasonably small in diameter. In case of larger radial runouts, the above-mentioned wedge shape of the scale increments will result in undesired changes in the shape of the signals generated by the scanning (this phenomenon is described as a pumping of the signals) so that such signals may no longer be usable for measuring, positioning and control purposes. To nevertheless permit a mounting of the transmitter disk directly on a shaft or spindle or motion-transmitting screw of a machine tool in such a manner that a larger radial runout will be permissible, it is known to provide angle encoders of the kind described first hereinbefore. In the known angle encoders of that kind the transmitter disk consists of a cylindrical drum, which on its outside cylindrical surface is provided with the two measuring scales, which are scanned with reflected light by the associated scanning units. For that purpose each increment of the measuring scale is composed of a highly reflective field and a less reflective field and the reflected light falls through scanning gratings onto photoelectric receivers. Such known angle encoders have the disadvantage that in the previous practice the measuring scales on each transmitter disk had to be generated directly on said disk so that the manufacturing costs are high, particularly if a small scale pitch is required. Even very small variations of the diameter of the transmitter disks, of an order of micrometers, will result in a change of the perimeter of the cylindrical surfaces which carry the measuring scales and will require a new measuring scale to be generated. Besides, no process has been available thus far which could be used to provide a measuring scale on a cylindrical outside surface by contact printing.

SUMMARY OF THE INVENTION

It is an object of the invention to provide an angle encoder in which a relatively large radial runout is permissible and the measuring scales of which can nevertheless be made in a simple manner and with high accuracy.

That object is accomplished in accordance with the invention in that the transmitter disk has at least one concentric frustoconical outside surface, which is provided with at least one circular measuring scales.

The or each measuring scale may be provided on the transmitter disk by printing processes and this will not be affected by any variations of the diameter of the transmitter disk because the or each measuring scale will be provided on an area which is exactly defined by its inside and outside diameters and the accuracy of the measurement will not be affected by the distance from the side edges of the measuring scale to the edges of the frustoconical outside surface of the transmitter disk. It will be sufficient to adjust the scanning means in adaptation to the measuring scale. In addition to the advantage which is due to the fact that the measuring scale can be more easily provided with a high accuracy by means of exposing masks, a further advantage afforded by the invention resides in that the angle encoder may be designed to be more compact than the angle encoders in which the scales are provided on a cylindrical peripheral surface if a defined angle of reflection is to be maintained between the illuminating means and the scanning grating for scanning with reflected light. The guidance of the scanning means and the transmitter disk relative to each other can also be simplified and improved. In that respect it will be preferred to provide two measuring scales on respective frustoconical outside surfaces, which are radially inwardly and axially outwardly inclined from the outside circumference of the transmitter disk on opposite sides thereof, preferably at equal and opposite angles relative to the axis of rotation of the disk, so that the associated scanning units can also be symmetrically arranged with respect to a diametral center plane which is normal to the axis of rotation of the transmitter disk.

The vertex angle of the imaginary cone which geometrically defines the or each frustoconical outside surface will depend on the overall conditions in each case. The smaller the pitch of the measuring scale, the smaller will be that vertex angle. On the other hand, a larger vertex angle may be selected to provide inclinations of the reflecting surfaces of the measuring scales to the direction in which light from the illuminating means is incident on the reflecting surfaces and the direction in which light is reflected to the scanning unit. If the measuring scale is made by contact printing, a clamping of the exposing mask during the exposure will be prevented if one-half of the vertex angle should be smaller than the friction angle between the exposing mask and the frustoconical outside surface, which has been sensitized to light. In practice the vertex angle of the cone which defines the or each frustoconical surface will be in most cases between 15 and 120 degrees.

In a preferred process of manufacturing transmitter disks for angle encoders in accordance with the invention the measuring scale is provided on the disk by a photographic printing process, e.g., a photolithographic process, in which the transmitter disk is provided at least on each of its fructoconical outside surfaces with a light-sensitive coating and an exposing mask having a conical inside surface is placed on said sensitized surface for the exposure. If the conical inside surface of said exposing mask has the same vertex angle as the frustoconical surface of the transmitter disk, the exposing mask can be exactly centered on said frustoconical surface with respect to the axis of the disk.

BRIEF DESCRIPTION OF THE DRAWING

FIG. 1 is a schematic axial central sectional view showing an angle encoder embodying the invention.

FIG. 2 is a side elevation showing the angle encoder of FIG. 1 on a smaller scale.

DETAILED DESCRIPTION OF THE PREFERRED EMBODIMENT

Further details and advantages of the invention will become apparent from the following description of an illustrative embodiment of the invention shown in the drawing.

The illustrated angle encoder comprises an annular transmitter disk 1, which is formed with a concentric bore 2, which defines an axis of rotation and by which the disk 1 can be non-rotatably mounted on a shaft or spindle or rotatable screw of a machine tool. The transmitter disk 1 may be made of steel. As is apparent from the drawing the transmitter disk 1 has a cylindrical outside peripheral surface 3 and two frustoconical outside surfaces 4 and 5, which are symmetrical with respect to the surface 3 and are axially outwardly and radially inwardly inclined from the surface 3 on opposite sides thereof to extend at equal and opposite angles to said axis of rotation. Each of the surfaces 4 and 5 is provided with a circular measuring scale 6 or 7, which is normal to said diametral center plane. One of said measuring scales has a small pitch and has, e.g., 18,000 graduation lines, which are regularly spaced around the periphery. The other scale may have $2^n$ lines, e.g., 1024 graduation lines. To provide the measuring scales, the surfaces 4 and 5 are provided with a light-sensitive coating or by any other known process are rendered sensitive to the exposure to a radiation pattern. Thereafter, an exposing mask defining the measuring scale is placed on that of the surfaces 4 and 5 which is to be exposed. That exposing mask has a conical inside surface, which conforms to the surface 4 or 5 and is provided with a master scale, which is to be copied. The snug contact between the frustoconical outside surface and the conical inside surface and a proper adjustment of the exposing mask relative to the disk 1 will ensure that the measuring scales provided on the surface 4 and 5 by the exposures will be centered on the axis of the disk 1. The exposure is succeeded by a developing step, which is known per se and by which each scale is rendered visible in the form of reflective graduation lines, which are separated by non-reflecting areas.

A scanning head 8 comprising a housing 9 is associated with the transmitter disk 1. The housing 9 accommodates two scanning units 10 and 11 for scanning the two measuring scales 6 and 7. Each of said scanning units 10 and 11 comprises illuminating means comprising a light source consisting, e.g., of a light-emitting diode 12 or 13, and a succeeding optical system, and also comprises a scanning grating plate 14 or 15 extending over the measuring scale 6 or 7, and a printed circuit board 16 or 17 provided with photoelectric receivers, which receives the light which has been reflected by the measuring scale 6 or 7 through the scanning grating plate 14 or 15 and convert said light into electric measured-value signals and/or control signals. The generation of said signals and the various ways in which the generated signals can be utilized are well known in the art and need not be described herein. In an angle encoder of the illustrated kind, in which the measuring scales 6 and 7 have a mean diameter of 150 mm, the measuring scale 6 has a small pitch and consists of 18,000 graduation lines, and the measuring scale 7 has 1024 graduation lines, the quality of the generated signals will not adversely be affected by a radial runout up to 25 μm of the shaft or motion-transmitting screw by which the transmitter disk 1 is rotated.

The exposing masks used in the manufacturing process described hereinbefore may consist of hollow frustoconical members having in an axial and radial section approximately the shape shown for the scanning grating plates 14 and 15 in FIG. 1. The master scale is provided on the conical inside surface of the mask. Alternatively it is possible to use exposing masks which consist of optical prisms consisting, e.g., of annular triangular prisms which have an inside conical surface and supplement the transmitter disk 1 to form a fully cylindrical ring.

We claim:
1. In an angle encoder comprising
   a transmitter disk, which has means defining an axis of rotation and is adapted to be mounted for rotation about said axis and is provided with at least one circular measuring scale centered on said axis, and scanning means, which are associated with said at least one measuring scale and during a rotation of said disk relative to said scanning unit about said axis are adapted to scan said at least one measuring scale with reflected light and to optoelectronically generate electric signals for indicating the angular position of said disk about said axis in response to said scanning, the improvement residing in that said transmitter disk has at least one frustoconical outside surface, which is centered on said axis, and said at least one measuring scale is provided on said at least one frustoconial surface.

2. The improvement set forth in claim 1 as applied to an angle encoder in which said transmitter disk is provided with two of said measuring scales, wherein said two measuring scales are provided on at least one of said frustoconical surfaces and said scanning means comprise two scanning units, which are associated with and adapted to scan respective ones of said measuring scales.

3. The improvement set forth in claim 2, wherein said transmitter disk is provided with two of said frustoconical outside surfaces on opposite sides of said disk and each of said frustoconical outside surfaces is provided with one of said measuring scales.

4. The improvement set forth in claim 3, wherein each of said frustoconical surfaces is axially outwardly and radially inwardly inclined.

5. The improvement set forth in claim 4, wherein said two frustoconical outside surfaces extend at equal and opposite angles to said axis of rotation.

6. The improvement set forth in claim 5, wherein said transmitter disk has a diametral center plane, which is at right angles to said axis of rotation, and said two frustoconical surfaces are symmetrical with respect to said diametral center plane.

7. The improvment set forth in claim 1, wherein said frustoconical outside surface is axially outwardly and radially inwardly inclined.

8. The improvement set forth in claim 1, wherein said frustoconical outside surface is geometrically defined by an imaginary cone having a vertex angle between 15 and 120 degrees.

9. The improvement set forth in claim 1 as applied to an angle encoder in which said scanning means are adapted to generate measured-value signals in response to said scanning.

10. The improvment set forth in claim 1 as applied to an angle encoder in which said scanning means are adapted to generate control signals in response to said scanning.

11. The improvement set forth in claim 10, wherein said at least one measuring scale is provided on said at least one frustoconical outside surface by a photolithographic process.

12. The improvement set forth in claim 1, wherein said at least one measuring scale comprises at least one incremental scale.

13. In a transmitter disk for use in an angle encoder comprising scanning means for scanning at least one measuring scale during a rotation of said scale relative to said scanning means about an axis with reflected light and for optoelectronically generating electric signals for indicating the angular position of said scale about said axis in response to said scanning, wherein said transmitter disk comprises means for defining said axis of rotation and is provided with said at least one measuring scale, the improvement residing in that said transmitter disk has at least one frustoconical outside surface, which is centered on said axis, and said at least one measuring scale is provided on said at least one frustoconical surface.

14. In a process of manufacturing a transmitter disk for use in an angle encoder comprising scanning means for scanning at least one measuring scale during a rotation of said scale relative to said scanning means about an axis with reflected light and for optoelectronically generating electric signals for indicating the angular position of said scale about said axis in response to said scanning, wherein said transmitter disk comprises means for definning said axis of rotation and is provided with said at least one measuring scale, said transmitter disk has at least one frustoconical outside surface, which is centered on said axis, and said at least one measuring scale is provided on said at least one frustoconical surface, the improvement residing in that said at least one measuring scale is provided on said at least one frustoconical outside surface by a photographic process, in which said at least one frustoconical outside surface is provided with a light-sensitive coating, an exposing mask, which has a conical inside surface conforming to said frustoconical outside surface and is provided on said conical inside surface with means defining said measuring scale is mounted on said disk so that said conical inside surface is in snug contact with said frustoconical outside surface, and said light-sensitive coating is exposed to light through said exposing mask.

* * * * *